United States Patent
Watazu et al.

(10) Patent No.: US 9,507,456 B2
(45) Date of Patent: Nov. 29, 2016

(54) TOUCH PANEL WITH PRESSING-FORCE MEASURING PERFORMANCE

(71) Applicant: NISSHA PRINTING CO., LTD., Kyoto-shi, Kyoto (JP)

(72) Inventors: Yuji Watazu, Kyoto (JP); Junichi Shibata, Kyoto (JP); Shuzo Okumura, Kyoto (JP); Keisuke Ozaki, Kyoto (JP); Takao Hashimoto, Kyoto (JP)

(73) Assignee: NISSHA PRINTING CO., LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 14/769,360

(22) PCT Filed: Dec. 25, 2013

(86) PCT No.: PCT/JP2013/084583
§ 371 (c)(1),
(2) Date: Aug. 20, 2015

(87) PCT Pub. No.: WO2014/129083
PCT Pub. Date: Aug. 28, 2014

(65) Prior Publication Data
US 2015/0355771 A1    Dec. 10, 2015

(30) Foreign Application Priority Data

Feb. 23, 2013 (JP) ................................ 2013-033974
May 27, 2013 (JP) ................................ 2013-110656

(51) Int. Cl.
*G06F 3/045* (2006.01)
*G06F 3/041* (2006.01)
*G06F 3/044* (2006.01)

(52) U.S. Cl.
CPC ............ *G06F 3/0414* (2013.01); *G06F 3/044* (2013.01); *G06F 2203/04105* (2013.01); *G06F 2203/04106* (2013.01)

(58) Field of Classification Search
CPC ...... G06F 3/0414; G06F 3/047; G06F 3/041; G06F 3/044; G06F 2203/04106; G06F 2203/04105

USPC ......................................................... 345/173
See application file for complete search history.

(56) References Cited

U.S. PATENT DOCUMENTS

| | | | | |
|---|---|---|---|---|
| 2011/0115729 A1* | 5/2011 | Kremin | ................. | G06F 3/0418 345/173 |
| 2011/0279390 A1* | 11/2011 | Park | ........................ | G06F 3/044 345/173 |
| 2013/0027340 A1* | 1/2013 | Kodani | ................... | G06F 3/041 345/173 |

FOREIGN PATENT DOCUMENTS

| | | | | |
|---|---|---|---|---|
| JP | 2010-108490 A | 5/2010 | | |
| JP | 2011-221720 A | 11/2011 | | |
| JP | WO 2013021835 A1 * | 2/2013 | ............. | G06F 3/044 |
| WO | 2013/021835 A1 | 2/2013 | | |

OTHER PUBLICATIONS

PCT, "International Search Report for International Application No. PCT/JP2013/084583".

(Continued)

*Primary Examiner* — Towfiq Elahi
(74) *Attorney, Agent, or Firm* — Manabu Kanesaka

(57) ABSTRACT

A touch panel equipped with both a capacitive sensor and a piezoelectric sensor, wherein the touch panel solves the problems of increased panel thickness, changes in the optical properties, and increased manufacturing costs. This touch panel is provided with force measurement using a piezoelectric body and capacitive point detection. The force measurement uses a pair of electrodes arranged with the piezoelectric body sandwiched therebetween. The point detection uses one electrode and another electrode. At least one top electrode is disposed on the side of the top surface of the piezoelectric body, and at least one bottom electrode is disposed on the side of the bottom surface of the piezoelectric body. One electrode among the pair of electrodes used in force measurement is a bottom electrode, and at least one electrode among the two electrodes used in point detection is a top electrode.

7 Claims, 10 Drawing Sheets

(56) References Cited

OTHER PUBLICATIONS

PCT/IB/338, "Notification of Transmittal of Translation of the International Preliminary Report on Patentability for International Application No. PCT/JP2013/084583," Sep. 3, 2015.
PCT/IB/373, "International Preliminary Report on Patentability for International Application No. PCT/JP2013/084583," Aug. 25, 2015.
PCT/ISA/237, "Written Opinion of the International Searching Authority for International Application No. PCT/JP2013/084583," Mar. 25, 2014.
PCT/IB/326, "Notification Concerning Transmittal of International Preliminary Report on Patentability for International Application No. PCT/JP2013/084583," Sep. 3, 2015.

* cited by examiner

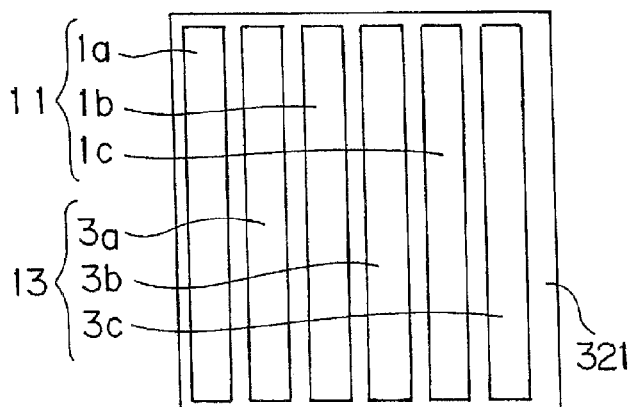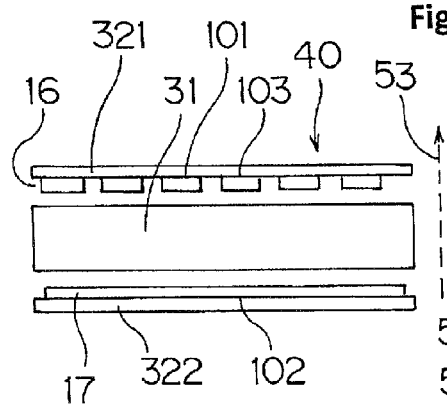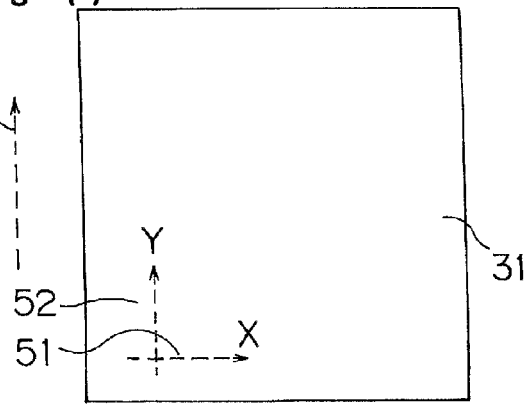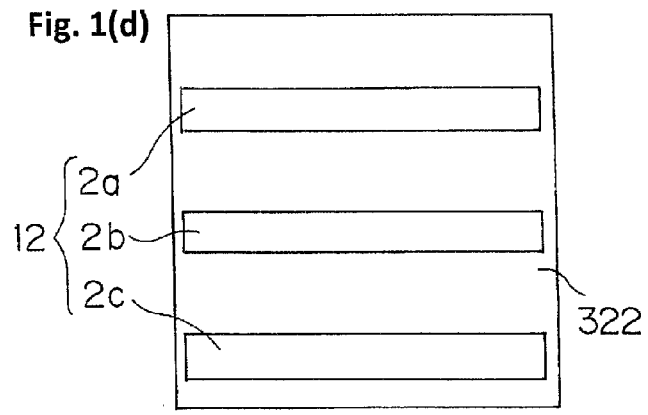

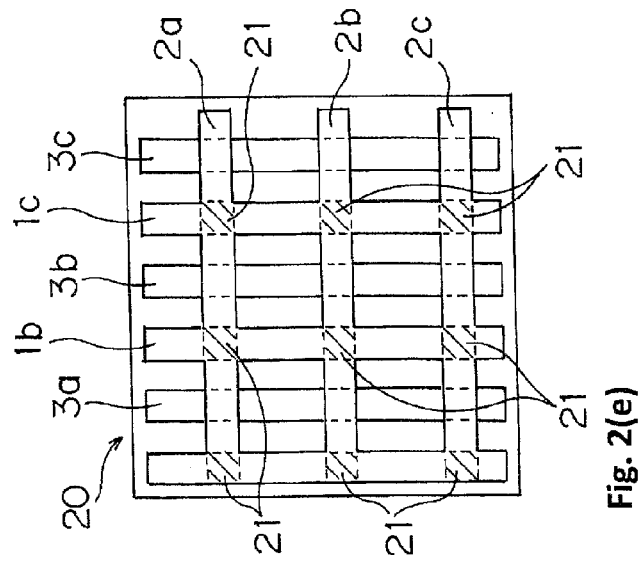
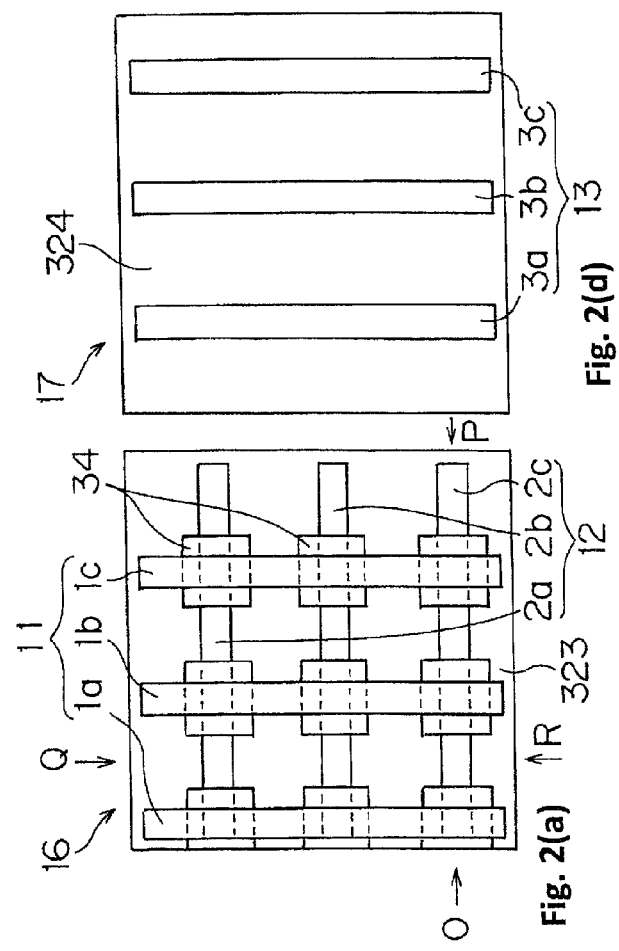
Fig. 2(a), Fig. 2(b), Fig. 2(c), Fig. 2(d), Fig. 2(e)

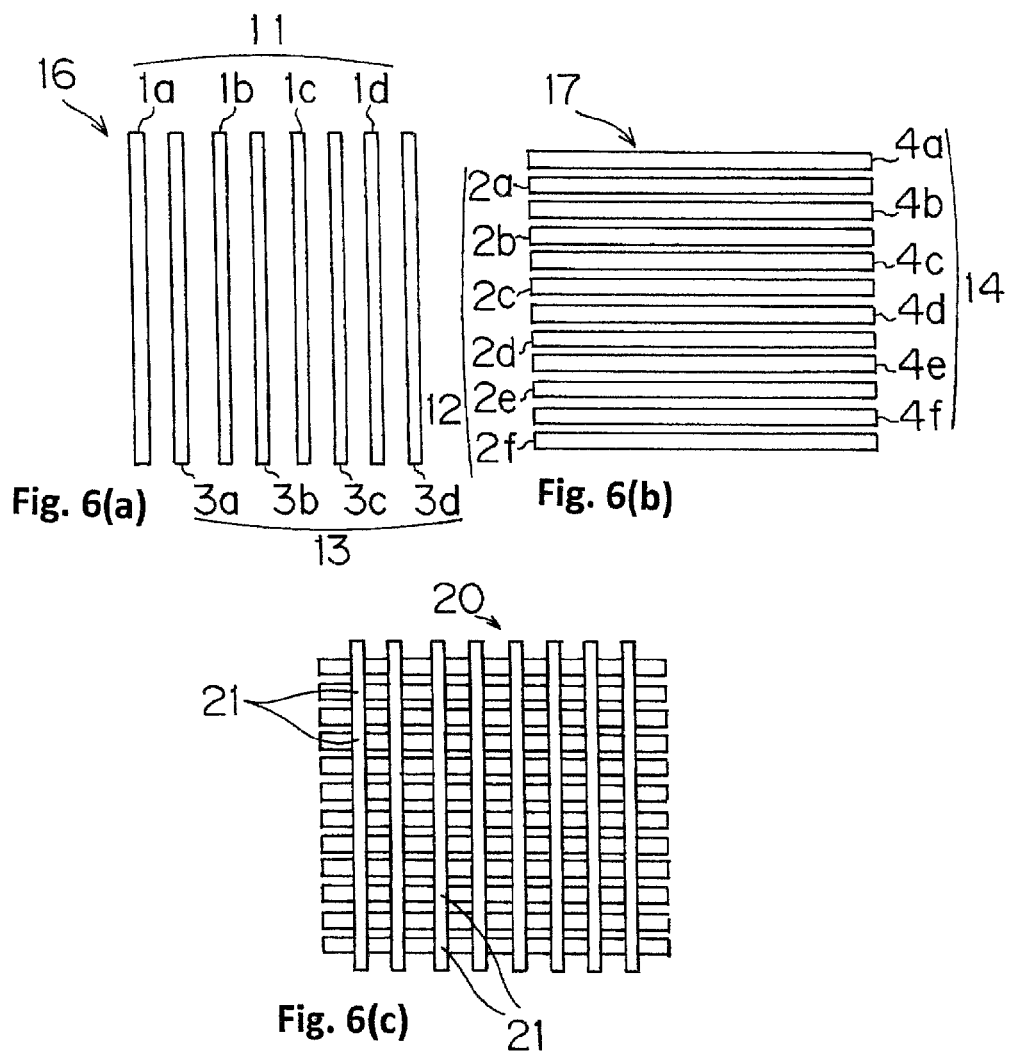

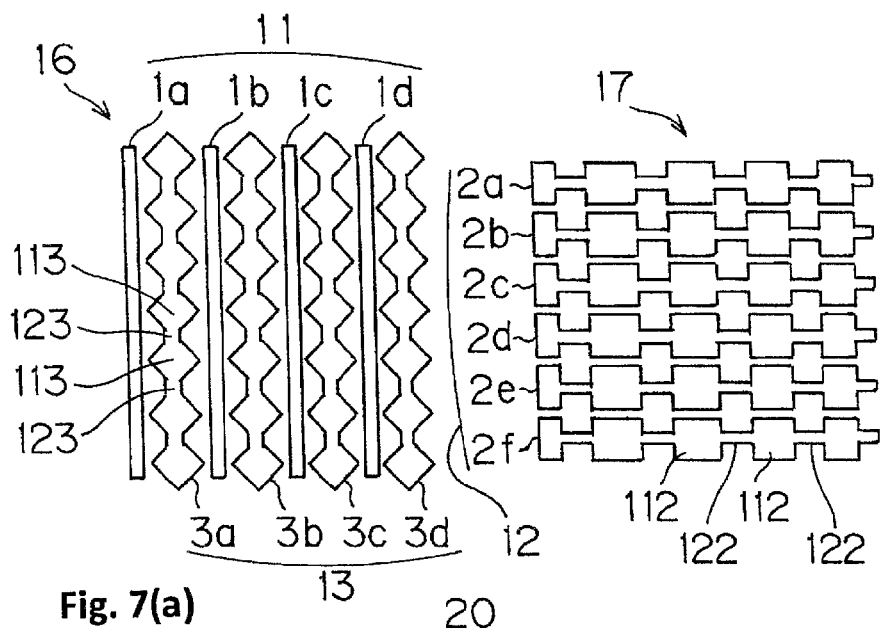
Fig. 7(a)
Fig. 7(b)
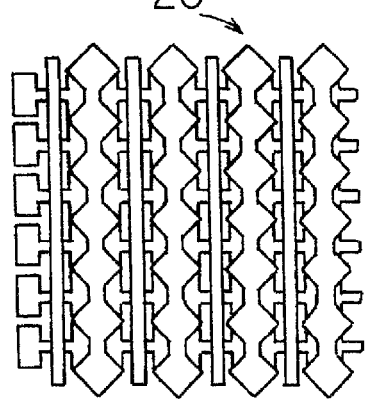
Fig. 7(c)

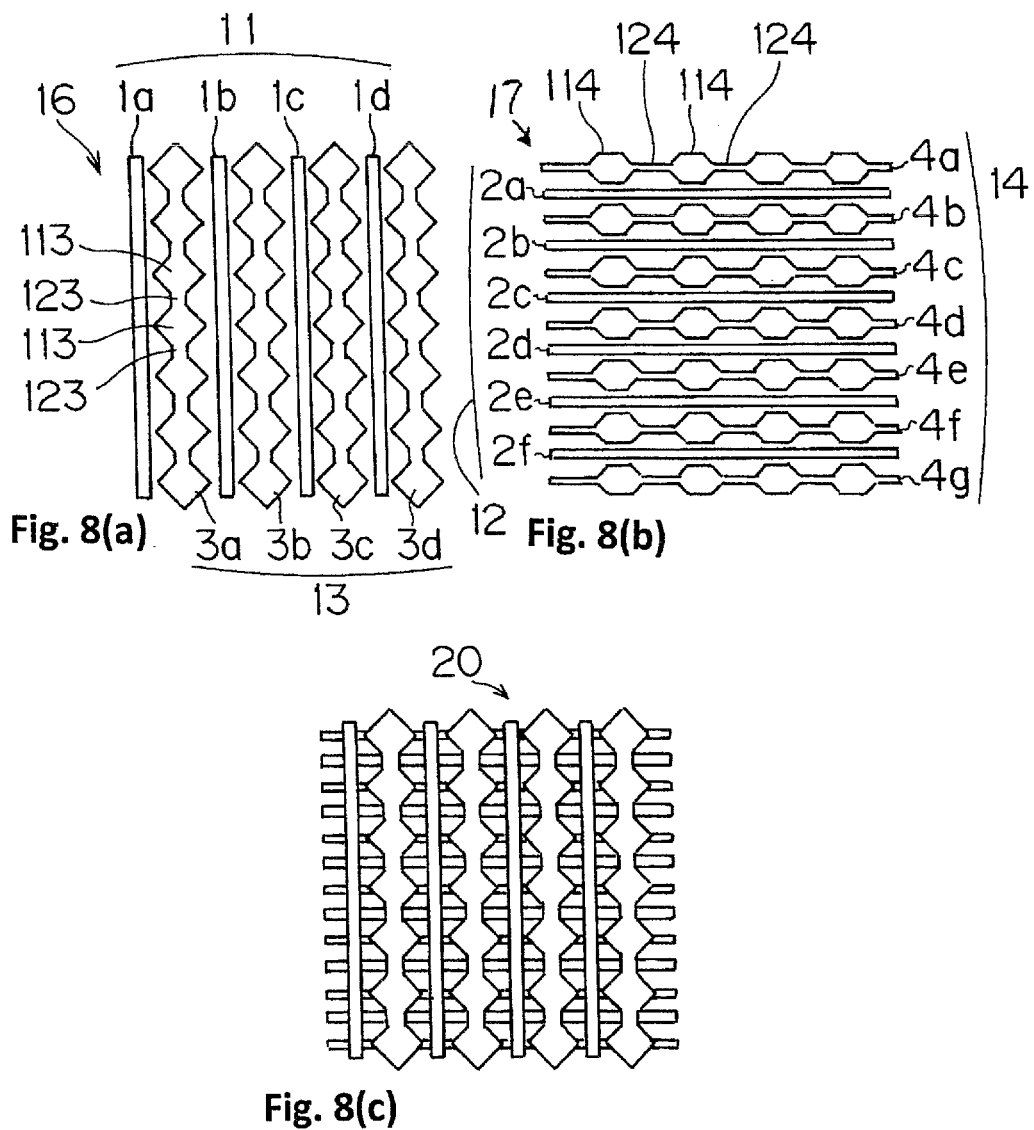

TOUCH PANEL WITH PRESSING-FORCE MEASURING PERFORMANCE

RELATED APPLICATIONS

The present application is National Phase of International Application No. PCT/JP2013/084583 filed Dec. 25, 2013, and claims priority from Japanese Applications No. 2013-033974, filed Feb. 23, 2013 and No. 2013-110656 filed May 27, 2014, the disclosure of which is hereby incorporated by reference herein in its entirety.

TECHNICAL FIELD

The present invention relates to a touch panel provided with performances of pressing force measurement using a piezoelectric body and point detection by capacitive sensing system.

BACKGROUND ART

A touch panel has a capacitive sensor to detect an input point and a piezoelectric sensor to measure pressing force.

Touch panels functioning as both capacitive and piezoelectric sensors to detect an input point and measure pressing force have been known in prior art (for example, those disclosed in Patent literatures 1 and 2). These conventional touch panels are fabricated by layering a capacitive sensor on the top or bottom surface of a piezoelectric sensor. Such layer of the two types of sensors result in increased thickness of touch panels, undesirable change in optical properties, such as transparency, of touch panels, and increased manufacturing cost.

CITATION LIST

Patent Literature

PTL 1: Japanese Patent Publication Laid Open 2011-221720
PTL 2: Japanese Patent Publication Laid Open 2010-108490

SUMMARY OF INVENTION

Technical Problem

The problems to be solved by the present invention are the disadvantages of touch panels functioning as both capacitive and piezoelectric sensors, i.e., undesirable increase in panel thickness, change in optical properties and increased manufacturing cost.

Other problems to be solved by the present invention are apparently explained in the following description of the present invention.

Solution to Problem

A touch panel according to one embodiment of the present invention is provided with the performances of force measurement using a piezoelectric body and point detection using projected capacitive system, and includes:

a pair of electrodes arranged with a plate-like piezoelectric body sandwiched between the electrodes, in which each of the pair of electrodes is composed of a conductive member, the piezoelectric body has a plate-like surface parallel to a x-y plane, the piezoelectric body and the pair of electrodes are layered vertically, and the pair of electrodes are employed for the force measurement, and two types of electrodes including one type composed of a group of conductive members arranged parallel to a certain direction on the x-y plane and the other type composed of another group of conductive members arranged parallel to a direction across the certain direction on the x-y plane, the two types of electrodes which is employed for the point detection.

At least one upper electrode is disposed on the side of the top surface of the piezoelectric body, the conductive member constituting the upper electrode has at least a part forming a plane parallel to the x-y plane, at least one lower electrode is disposed on the side of the bottom surface of the piezoelectric body, the conductive member constituting the lower electrode has at least a part forming a plane parallel to the x-y plane, one of the pair of electrodes used for the force measurement is the lower electrode, and at least one of the two types of electrodes used for the point detection is the upper electrode.

The group of the conductive members of the present invention may be composed of either a single conductive member or a plurality of conductive members. The number of the electrodes included in the upper electrode may be one, two, or three. The number of the electrodes included in the lower electrode may be one, two, or three. In a single touch panel, the sum of the number of the electrodes included in the upper and lower electrodes is three or four.

The force measurement in the present invention means the measurement of pressing force generated when a touch panel is pressed. The pressing force on the touch panel is generated from the pressure by a finger, stylus pen, etc. The point detection means the detection of a specific point on the touch panel at which the panel is contacted. The contact to the touch panel is generated when the touch panel is contacted by a finger, stylus pen, etc. The touch panel of the present invention is usually transparent. The term "transparent" means that the touch panel has an optical transparency, more specifically, a total light transmittance of 40% or higher, which is measured in the method described in ASTM D1003. In addition, the touch panel may be opaque.

The touch panel according to the first preferred embodiment includes a metal frame disposed under the piezoelectric body, the pair of electrodes used for the force measurement is composed of a sensing electrode and a ground electrode, and the frame may function as the lower electrode which may be a single electrode and the ground electrode.

The touch panel according to the first embodiment utilizes a frame with which the touch panel is attached to housing as a ground electrode. Such frame has been conventionally attached to touch panels. The touch panel according to the first embodiment is advantageous to maintaining better optical properties, because it does not require a specific part used as the lower electrode.

The touch panel according to the second preferred embodiment of the present invention is used on the display surface of a display device, and the visible light emitted from the display surface of the display device is linearly-polarized light. At the same time, the piezoelectric body included in the touch panel is a wave plate which may be used in an arrangement to make an angle ranging from 20 degrees to 70 degrees between the slow axis of the wave plate or the piezoelectric body and the plane of vibration of the linearly-polarized light. The retardation value of the piezoelectric body may range (1) from 110 nm to 170 nm or (2) from 800 nm to 30,000 nm.

A display device like as a liquid crystal display (LCD), which emit linearly-polarized light from its display surface, usually blacks out when it is observed through polarized sunglasses. The "blackout" is a phenomenon that darkens display surface, and occurs when the vibration axis of light emitted from a display surface and the absorption axis of polarized sunglasses coincide.

For avoiding the blackout, a prior art proposed a quarter-wave plate disposed in front of a display device to shift the state of polarization of light (for example, Japanese Patent Publication Laid Open 1994-258633).

The touch panel according to the second preferred embodiment of the present invention is used on the display surface of a display device. The touch panel includes a piezoelectric body imparted with the property of wave plate. The piezoelectric body functions as the means of force measurement and also as the means of shifting the state of polarization of visible light emitted from the display device.

In the preferred embodiment, the wave plate is arranged to make a certain angle between the slow axis of the wave plate and the plane of vibration of the linearly-polarized light so as to enable the polarization state of the linearly-polarized light to be properly shifted. The angle between the slow axis of the wave plate and the plane of vibration of the linearly-polarized light is the smaller of the two angles made at the intersection of the axis and the plane. The plane of vibration of linearly-polarized light is perpendicular to the absorption axis of the polarization means placed nearest to the point of observation among several polarization means placed in the light path of the display device.

The piezoelectric body having a retardation value ranging (1) from 110 nm to 170 nm polarizes the visible light circularly or elliptically to avoid the blackout. The piezoelectric body having a retardation value ranging (2) from 800 nm to 30,000 nm transforms the visible light into almost natural light before the light is emitted from the piezoelectric body. Thus the display member can be observed through polarized sunglasses without change in color.

In both cases mentioned above, the light passing through the piezoelectric body and emitted from the display device does not result in blackout. In other words, the touch panel has an advantage of requiring no specific wave plate to eliminate blackout if the touch panel is used with a certain type of a display device.

The performance of wave plate can be imparted to a piezoelectric body, for example, by uniaxial extension of piezoelectric film. Usually, piezoelectric film is uniaxially extended before it is polarized, and subsequently the film is polarized by loading voltage. The polarization operation is described later.

The display device having a display surface emitting linearly-polarized visible light includes means of polarization such as a polarization plate or polarization film placed in the path of the emitted light. Examples of the display devices emitting linearly-polarized visible light from their display surface include a liquid crystal display (LCD) and organic light-emitting diode (OLED).

The touch panel according to the third preferred embodiment of the present invention includes a display device disposed under the piezoelectric body.

The pair of electrodes used for the force measurement is composed of a sensing electrode and a ground electrode, the display device contains a display-constituting electrode which constitutes the display device and is used as the lower electrode, and the lower electrode is a single electrode and is the ground electrode.

The touch panel according to the third embodiment includes a display device, such as an LCD, and uses a display-constituting electrode originally contained in the display device also as a ground electrode for the touch panel. Examples of such display-constituting electrode include a common electrode used in a vertical alignment LCD and a charge-preventive electrode used in an in-plane switching LCD. The display-constituting electrode has been conventionally included in ordinary LCDs. The touch panel according to the third embodiment is advantageous to maintaining better optical properties, because it does not require a specific part used as the lower electrode.

For implementing the touch panel having the display device according to the third embodiment of the present invention, the display device should be a certain type of display device, the slow axis of the wave plate, i.e., the piezoelectric body, may make an angle ranging from 20 degrees to 70 degrees with the plane of vibration of the linearly polarized light, and the piezoelectric body may be a wave plate having a certain retardation value. The touch panel having the display device according to this preferred sub-embodiment shows the same effect as that of an electronic device containing a display device on which the touch panel according to the third embodiment mentioned above is placed.

The touch panel according to the fourth preferred embodiment of the present invention is composed of
two types of electrodes employed for the point detection and including the one type which essentially consists of the first conductive members composed of a group of conductive members and the other type which essentially consists of the second conductive members composed of a group of conductive members; and
the pair of electrodes employed for the force measurement and including a ground electrode and a sensing electrode, the sensing electrode which essentially consists of the third conductive members composed of a group of conductive members.

The third conductive members are arranged parallel to the first conductive members and set apart from the positional cross regions which are the cross regions of the first and second conductive members in a projection view of the electrodes in which the upper and lower electrodes are projected on a virtual x-y plane.

The touch panel according to the fourth embodiment has the positional cross regions set apart from the third conductive members. In other words, the sensing electrode for the pressure measurement does not cover the positional cross region so as to maintain the sensitivity of the point detection by the capacitive sensor.

The first conductive members may constitute a receiving electrode or transmission electrode.

The touch panel according to the fifth preferred embodiment of the present invention may have the third conductive members having wide and narrow parts arranged alternately and the narrow parts may cross the second conductive members in the projection view of the electrodes.

The touch panel according to the fifth embodiment has the sensing electrode having a wide area for the force measurement, and is advantageous to improved sensitivity of the force measurement.

The touch panel according to the sixth preferred embodiment of the present invention has the ground electrode which may also be used as the one type of the electrode or the other type of the electrode for the point detection. In other words, one of two types of electrodes used for the point detection is also used as the ground electrode. The electrode used for the dual purpose is grounded during the pressure measurement while it is connected to the point detection circuit during the point detection.

The touch panel according to the sixth embodiment has smaller number of electrodes to contribute to decreased costs for manufacturing electrodes, and is advantageous to maintaining optical properties, such as transparency.

The touch panel according to the seventh preferred embodiment of the present invention has the ground electrode which may also be used as the one type of the electrode or the other type of the electrode for the point detection.

The first conductive members constituting the one type of the electrode may have wide and narrow parts arranged alternately, and the wide parts of the first conductive members may overlap the wide parts of the third conductive members in the projection view of the electrodes.

The touch panel according to the seventh preferred embodiment of the present invention has the features of both touch panels according to the fourth embodiment and the fifth embodiment, and is advantageous to improved sensitivity of the pressure measurement, decreased costs for manufacturing electrodes, and maintaining optical properties, such as transparency.

The touch panel according to the eighth preferred embodiment of the present invention has the ground electrode composed of a group of the fourth conductive members. The fourth conductive members may have wide and narrow parts arranged alternately, and the third conductive members and the fourth conductive members may overlap each other at their wide parts in the projection view of the electrodes.

The touch panel according to the eighth embodiment has, in addition to other features, the third conductive members and the fourth conductive members which overlap each other at their wide parts in the projection view of the electrodes to increase the area of the electrode for the pressure measurement and further ensure the partial lamination of the piezoelectric body between the electrodes. Thus the touch panel is advantageous to more increased sensitivity of the measurement of electrical change of the piezoelectric body.

The touch panel according to the ninth preferred embodiment of the present invention has the piezoelectric body which may have localized piezoelectricity and only the part of the piezoelectric body covered by the third conductive members may be piezoelectric.

The point detection with the touch panel according to the ninth embodiment is not disturbed by electrical charge generated in the piezoelectric body by pressing force, and thus the touch panel is advantageous to maintaining high accuracy and improving sensitivity of the point detection.

The touch panel according to the tenth preferred embodiment of the present invention has the piezoelectric body having localized piezoelectricity, and only the part of the piezoelectric body covered by the overlap of the third and fourth conductive members may be piezoelectric.

The point detection with the touch panel according to the tenth embodiment is not disturbed by electrical charge generated in the piezoelectric body by pressing force, and thus the touch panel is further advantageous to maintaining high accuracy and improving sensitivity of the point detection.

The touch panel according to another preferred embodiment of the present invention may have a combination of the upper electrode and lower electrode shown in Table 1.

The touch panel according to another preferred embodiment of the present invention has a preferred arrangement and combination of the upper electrode and lower electrode.

The electronic device according to another embodiment of the present invention is composed of a touch panel and display device, the touch panel according to the present invention has the lower electrode attached beneath the piezoelectric body directly or with an adhesive, and the touch panel is disposed on the display surface of the display device.

The electronic device according to another embodiment of the present invention demonstrates a preferred use and applicable device for the touch panel according to the present invention.

The electronic device according to a preferred embodiment of the present invention has the display device of a certain type, the piezoelectric body is a wave plate having a certain retardation value, and the slow axis of the wave plate, i.e., the piezoelectric body, makes a certain angle with the plane of vibration of the linearly-polarized light.

The electronic device according to the preferred embodiment shows the same effect as that of an electronic device having a display device on which the touch panel according to the second embodiment is placed. The effect is also the same as that of a touch panel including the display device according to the preferred sub-embodiment.

The present invention, preferred embodiments of the present invention and the elements contained therein can be combined as far as possible to work the invention.

Advantageous Effects of Invention

The touch panel according to the present invention is provided with the performances of the force measurement and point detection, and, in addition to other matters specifying the invention, includes at least one upper electrode which partially forms a plane and is disposed on the side of the top surface of the piezoelectric body and at least one lower electrode which partially forms a plane and is disposed on the side of the bottom surface of the piezoelectric body. The lower electrode constitutes one of the pair of electrodes used for the force measurement and the upper electrode constitutes at least one of the two types of electrodes used for the point detection. Thus the touch panel is advantageous to fabricating thin touch panels, maintaining optical properties, and decreased manufacturing cost.

BRIEF DESCRIPTION OF DRAWINGS

FIGS. 1(a) to 1(d) are the illustrative diagrams of the touch panels.

FIGS. 2(a) to 2(e) are the illustrative diagrams of an upper electrode, a lower electrode, and a projection view of the electrodes.

FIGS. 4(a) and 4(b) are the illustrative diagrams of a touch panel which uses a component of an object to be incorporated in the touch panel as an electrode wherein, FIG. 4(a) is the sectional view of a touch panel including a frame, and FIG. 4(b) is the sectional view of a touch panel including a display device.

FIGS. 6(a) to 6(c) are illustrative diagrams showing examples of the electrode patterns.

FIGS. 7(a) to 7(c) are illustrative diagrams showing other examples of the electrode patterns.

FIGS. 8(a) to 8(c) are illustrative diagrams showing yet other examples of the electrode patterns.

DESCRIPTION OF EMBODIMENT

Figure 3:
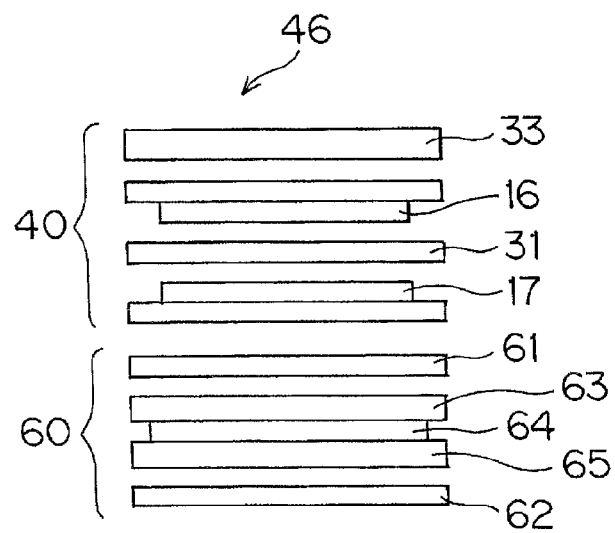
FIG. 3 is the sectional view of an electronic device composed of a touch panel and a display device.

The touch panel and electronic device according to the embodiments of the present invention are further described below referring to the figures. Some of the figures referred herein are pattern diagrams containing magnification of some elements for easy understanding of the present invention. Thus some of the dimensions or dimensional ratio between the elements may be different from that of actual devices. The dimensions, materials, forms, and relative positions of the members and parts described in the working examples of the present invention merely describe the present invention and are not intended to restrict the scope of the present invention unless otherwise specified. The numbers used as the signs may collectively represent parts, and alphabetical letters are sometimes added to such numbers for representing each of such parts. For example, the first conductive members are represented by the sign, 1, and each first conductive member is represented by the sign, 1a, 1b or 1c.

FIG. 1 is the illustrative diagram of the touch panel 40, FIG. 1(a) is the sectional view of the touch panel 40, FIG. 1(b) is the plan view of the upper electrode 16, FIG. 1(c) is the plan view of the piezoelectric body 31, and FIG. 1(d) is the plan view of the lower electrode 17. FIG. 2 is the illustrative diagram of the upper electrode 16, the lower electrode 17, and the projection view 20 of the electrodes. FIG. 2(a) is the plan view of the upper electrode 16. FIG. 2(b) is the sectional view of the upper electrode 16, and the plane of section is indicated by the arrows O and P in FIG. 2(a). FIG. 2(c) is the sectional view of the upper electrode 16, and the plane of section is indicated by the arrows Q and R in FIG. 2(a). FIG. 2(d) is the plan view of the lower electrode 17 and FIG. 2(e) is the projection view 20 of the electrodes.

The touch panel 40 is provided with the performances of force measurement using the piezoelectric body 31 and point detection by capacitive sensing system. The point detection is performed with projected capacitive system using two types of electrodes arranged to cross each other. The force measurement uses a pair of electrodes respectively disposed on the side of the top surface and the side of the bottom surface of the piezoelectric body 31.

The piezoelectric body 31 is a plate having a thickness from 1 μm to 200 μm. The material for constituting the piezoelectric body 31 includes piezoelectric ceramics, fluoride polymers and copolymers, and polymer materials having chirality. The piezoelectric ceramics include barium titanate, lead titanate, lead zirconate titanate, potassium niobate, lithium niobate, lithium tantalite, sodium tungstate, zinc oxide, potassium sodium niobate, bismuth ferrite, sodium niobate, and bismuth titanate. The fluoride polymers and copolymers include polyvinylidene fluoride, vinylidene fluoride-tetrafluoroethylene copolymer, and vinylidene fluoride-trifluoroethylene copolymer. The polymer materials having chirality include poly-L-lactic acid and poly-R-lactic acid.

In the present invention, specification, and drawings, a plane parallel to the plate-like surface of the piezoelectric body 40 is termed x-y plane. The direction of the x- and y-axes may be optionally defined. For descriptive purposes, the direction indicated by the dashed arrow 51 in FIG. 1(c) is defined as the direction of the x-axis, and the direction indicated by the dashed arrow 52 is defined as the direction of the y-axis, The upper electrode 16 is disposed on the side of the top surface of the piezoelectric body 31, and the lower electrode 17 is disposed on the side of the bottom surface of the piezoelectric body 31. The direction of layering the upper electrode 16, the piezoelectric body 31, and the lower electrode 17 is termed vertical direction, and is indicated by the dashed arrow 53 in FIG. 1(a).

A group of the first conductive members, 1a, 1b and 1c, and a group of the third conductive members, 3a, 3b and 3c, are formed on the bottom surface of the support film 321. The group of the first conductive members constitutes the receiving electrode (Rx) 11, and the group of the third conductive members constitutes the sensing electrode (Sx) 13. The surface of the group of the first conductive members contacting to the support film (hereinafter the surface of conductive members contacting to a support member such as support film is referred to as "support base") 101, and the support base 103 of the group of the third conductive members are located on the same plane. The plane is almost parallel to the x-y plane.

The first conductive members 1 constituting the receiving electrode (Rx) 11 are each formed into a rectangle shape, and their longitudinal direction is arranged parallel to the y-axis 52.

The group of the second conductive members, 2a, 2b and 2c, are formed on the top surface of the support film 322. The group of the second conductive members constitutes the transmission electrode (Tx) 12. The second conductive members constituting the transmission electrode (Tx) 12 are each formed into a rectangle shape, and their longitudinal direction is arranged almost parallel to the x-axis 51. The first conductive members 1 and the second conductive members 2 cross each other when they are projected on a single x-y plane. In other words, the receiving electrode (Rx) 11 and the transmission electrode (Tx) 12 cross each other to form a matrix. The crossing angle of the electrodes (the smaller of the two angles made at the intersection of the electrodes) is usually within the range from greater than 0 degree to 90 degrees, preferably from 60 degrees to 90 degrees, more preferably from 85 degrees to 90 degrees, and most preferably 90 degrees.

The electrode disposed on the side of the top surface of the piezoelectric body 31 is termed an upper electrode 16, and the electrode disposed on the side of the bottom surface of the piezoelectric body 31 is termed a lower electrode 17. The touch panel 40 shown in FIG. 1 includes two types of upper electrodes 16, i.e., the receiving electrode (Rx) 11 and sensing electrode (Sx) 13, and one type of lower electrode 17, i.e., the transmission electrode (Tx) 12.

A pair of electrodes is used for the force measurement. The pair of electrodes is composed of one type of electrode disposed on the side of the top surface of the piezoelectric body 31 and the other type of electrode disposed on the side of the bottom surface of the piezoelectric body 31. In other words, the pair of electrodes is arranged with the piezoelectric body 31 sandwiched between the electrodes. The touch panel 40 has the sensing electrode (Sx) 13 which is the one type of electrode disposed on the side of the top surface of the piezoelectric body. The other type of electrode is the transmission electrode (Tx) 12 disposed on the side of the bottom surface of the piezoelectric body, and the electrode is grounded to be used as a ground electrode (GND). The touch panel 40 has the ground electrode used as one of the pair of electrodes for the force measurement, and the electrode is the transmission electrode 12 disposed as the lower electrode.

The electrodes used for the point detection are the receiving electrode (Rx) 11 and transmission electrode (Tx) 12. The transmission electrode (Tx) is disconnected from ground and applied with transmission signal voltage. At least one type of the two types of electrodes used for the point detection of the touch panel 40 is the receiving electrode 11 disposed as the upper electrode.

The upper and lower electrodes of other arrangements and combinations, and the state of projected electrodes are described by referring to FIG. 2.

The upper electrode 16 shown in FIG. 2(a) has the receiving electrode (Rx) 11 and the transmission electrode (Tx) 12. The receiving electrode (Rx) 11 is composed of the group of the first conductive members, 1a, 1b and 1c, formed on the support film 323. The first conductive members, 1a, 1b and 1c, are each formed into a rectangle shape, and their longitudinal direction is arranged parallel to the y-axis. The transmission electrode (Tx) is formed on the support film 323. The support film 323 is identical to the support film 323 on which the receiving electrode (Rx) is formed. The transmission electrode (Tx) 12 is composed of a group of the second conductive members, 2a, 2b and 2c, formed on the support film 323. The second conductive members, 2a, 2b and 2c, are each formed into a rectangle shape, and their longitudinal direction is arranged almost parallel to the x-axis.

The insulator 34 is inserted between the first conductive members 1 and the second conductive members 2 at their intersections. As shown in FIG. 2(a) and FIG. 2(b), the second conductive members 2 are formed on the support film 323, and some parts of the second conductive members 2 are covered with the insulator 34. The first conductive members 1 are formed to cross the parts of the second conductive members 2 covered with the insulator 34.

The first conductive members 1 are composed of the parts contacting to the insulator 34 and of the support bases 101 contacting to the support film 323, and the parts and support bases are arranged alternately in the longitudinal direction. The support bases 101 of the first conductive members 1 and the support bases 102 of the second conductive members 2 are on the same plane. The plane is the surface of the support film 323, and is parallel to the x-y plane.

The lower electrode 17 shown in FIG. 2(d) includes the sensing electrode (Sx). The sensing electrode (Sx) 13 is composed of a group of the third conductive electrodes, 3a, 3b and 3c, formed on the support film 324. The third conductive electrodes, 3a, 3b and 3c, are each formed into a rectangle shape, and their longitudinal direction is arranged parallel to the y-axis.

FIG. 2(e) shows a projection view 20 of the electrodes in which the upper electrode 16 and the lower electrode 17 are projected on a single virtual plane. The virtual plane is parallel to the x-y plane.

In the projection view 20 of the electrodes, the first conductive members, 1b and 1c, are arranged parallel to the third conductive members, 3a, 3b and 3c.

In addition, the cross regions of the first conductive members 1 and the second conductive members 2 in the projection view 20 of the electrodes are termed positional cross regions 21. The insulators 34 inserted at the positional cross regions 21 are omitted in FIG. 2(e). The positional cross regions 21 are set apart from the third conductive members 3. Such arrangement is preferable because the sensitivity of the point detection with capacitive sensing system can be maintained.

In the lower electrode 17 shown in FIG. 2, longitudinal direction of the third conductive members 3 may be arranged parallel to the x-axis The following description teaches the addition of the ground electrode for the force measurement to the upper and lower electrodes shown in FIG. 2. The ground electrode for the force measurement is attached to the upper electrode 16. The ground electrode for the force measurement is composed of the fourth conductive members formed on the support film 323. In the projection view of the electrodes, it is preferable to set the positional cross regions 21 apart from the fourth conductive members 4 in addition to setting the positional cross regions 21 apart from the third conductive members 3. Such arrangement of the electrodes maintains the sensitivity of the point detection after the addition of the ground electrode for the force measurement.

The touch panel 40 is attached to the surface of a display device and used. FIG. 3 is the sectional view of the electronic device 46 composed of the touch panel 40 and display device 60. The touch panel 40 has the upper electrode 16 disposed on the top surface of the piezoelectric body 31 and the lower electrode 17 disposed on the bottom surface of the piezoelectric body 31. The piezoelectric body 31 and the lower electrode 17 may be bonded with an adhesive, in other words, the lower electrode 17 may be attached beneath the piezoelectric body 31 with an adhesive.

In addition, the piezoelectric body 31 and the lower electrode 17 may be bonded together with pressure from, for example, a frame, in other words, the lower electrode 17 may be directly attached beneath the piezoelectric body 31.

The touch panel 40 include the surface member 33 of a material, such as glass, disposed on the top surface of the touch panel 40.

The display device 60 shown in FIG. 3 is a LCD (liquid crystal display). The LCD is an example of the display device. The display device 60 has the upper polarization plate 61, liquid crystal 64 enclosed between the upper glass plate 63 and lower glass plate 65, and the lower polarization plate 62. The top surface of the upper polarization plate 61 is the display surface on which the touch panel 40 is placed.

The display device 60 is not restricted to LCD, and publicly known display devices can be employed. Such publicly known display devices include a PDP (plasma display panel) and OLED (organic light-emitting diode).

The electronic device 46 can be applied to the devices, for example, mobile phones, digital cameras, ticket-vending machines, automated teller machines of financial institutions, and the like.

The electronic device 46 mentioned above is equivalent to so-called external touch panels.

For the lower electrode of the touch panel, not only a specific part constituting the touch panel but also a component of an object to be incorporated in the touch panel can be used.

A plurality of bumps may be made between the touch panel 40 and the display device 60 in order to improve the sensitivity of the force measurement. The bumps make the touch panel bend more when pushed down with a finger to improve the sensitivity of the force measurement.

The touch panel 40 and/or the display device 60 may be given antireflection treatment. In addition, film with antireflection treatment may be placed between the touch panel 40 and the display device 60. The antireflection treatment forms inorganic thin film of silica or fluorides, organic thin film of fluororesins, or asperities of nano size or sub-micron size on the surface of a substrate. The antireflection treatment can control the reflection on the surface of a touch panel or display.

Figure 4A:
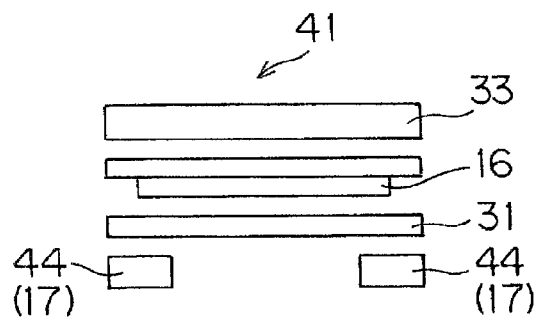
Figure 4B:
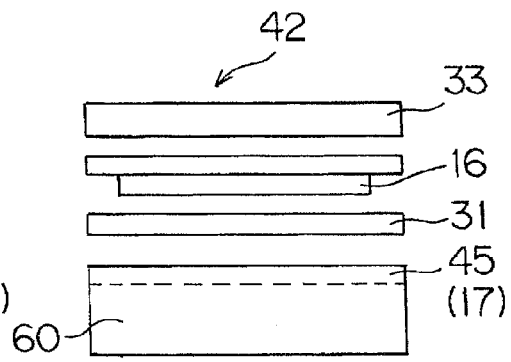

FIG. 4 is an illustrative diagram of a touch panel in which a component of an object to be incorporated in the touch panel is used as an electrode. FIG. 4(a) is the sectional view of a touch panel including a frame, and FIG. 4(b) is the sectional view of a touch panel including a display device.

In FIG. 4(a), the touch panel 41 including the frame has the upper electrode 16 and surface member 33 disposed on the side of the top surface of the piezoelectric body 31. The touch panel 41 has the frame 44 used to attach the touch panel 41 to a housing. The frame 44 is disposed on the side of the bottom surface of the piezoelectric body 31.

The frame 44 has a planar shape of casing trim, in other words, the center of the frame is open. The frame 44 is made of metal, usually a stainless plate.

The touch panel 41 uses the frame 44 as the lower electrode. The touch panel 41 has the lower electrode 17 composed of one type of electrode which is a ground electrode (GND). The upper electrode 16 includes three types of electrodes, i.e., one type and the other type of electrodes for the point detection and the sensing electrode for the force measurement.

The touch panel 41 including the frame is placed on the display surface of a display device to be used as an electronic device. The frame 44 of the touch panel 41 is attached beneath the piezoelectric body 31 directly or with an adhesive or pressure-sensitive adhesive and functions as the lower electrode 17.

In FIG. 4(b), the touch panel 42 including the display device has the upper electrode 16 and the surface member 33 on the side of the top surface of the piezoelectric body 31. The piezoelectric body 31 is placed on the display device 60.

The lower electrode 17 is disposed near the display surface of the display device 60. The lower electrode 17 can be used also as the electrode for controlling display. More specifically, the lower electrode 17 can also be used as a common electrode in a display device of VA (vertical alignment) LCD. In a display device of IPS (in-plane switching) LCD, the lower electrode 17 can also be used as an electrode for preventing electric charge.

The touch panel 42 has no specific lower electrodes and uses the display-constituting electrode 45 as the lower electrode. The touch panel 42 uses one type of lower electrode, which is a ground electrode (GND). The display-constituting electrode is grounded to function as the ground electrode (GND) during the force measurement by the touch panel 42.

The upper electrode 16 includes three types of electrodes, i.e., one type of electrode and the other type of electrode for the point detection, and a sensing electrode for the force measurement.

Figure 5:
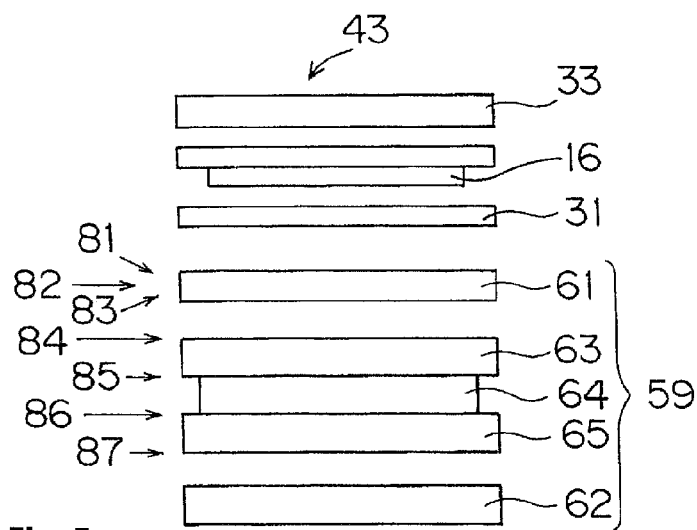
FIG. 5 is the sectional view illustrating the positions at which a lower electrode is incorporated in an all-in-one touch panel integrated with a display device.

The lower electrode of the touch panel of the present invention may be built into the display device of an all-in-one touch panel in which a touch panel and display device are integrated. FIG. 5 is the sectional view illustrating the positions at which a lower electrode is incorporated in an all-in-one touch panel integrated with a display device.

The all-in-one touch panel has the upper electrode 16 and the surface member 33 disposed on the side of the top surface of the piezoelectric body 31. The display device 59 with built-in electrodes for the touch panel shown in the figure is an LCD. The LCD, i.e., the display device 59 with built-in electrodes for the touch panel, includes liquid crystal 64 enclosed between the upper glass plate 63 and lower glass plate 65. The upper polarization plate 61 is disposed on the side of the top surface of the upper glass plate 63 and the lower polarization plate 62 is disposed on the side of the bottom surface of the lower glass plate 65.

The upper polarization plate 61 and lower polarization plate 62 are manufactured by layering a plurality of film pieces.

The seven arrows (the arrows from 81 to 87) indicate the positions to which a lower electrode can be incorporated in the display device 59 having built-in electrodes for the touch panel.

The upper polarization plate 61 is manufactured by layering a plurality of film pieces and the lower electrode can be inserted in the intermediate spaces between the film pieces indicated by the arrows 81, 82, and 83. The position for the insertion indicated by the arrow 84 is the top surface of the upper glass plate 63, and the position for the insertion indicated by the arrow 85 is the bottom surface of the upper glass plate 63. The position for the insertion indicated by the arrow 86 is the top surface of the lower glass plate 65, and the position for the insertion indicated by the arrow 87 is the bottom surface of the lower glass plate 65.

The lower electrode may be formed on one surface of the support film, and fixed by adhering or sandwiching on or between the layers of film (at the positions indicated by the arrows 81, 82 or 83) and glass plate (at the positions indicated by the arrows 84, 85, 86 or 87). The lower electrode can also be formed directly on the surface of the upper polarization plate 61 or the upper or lower glass plate.

The combinations of the electrodes to be arranged are shown in Table 1.

TABLE 1

Table: Combination of Electrodes

| | Upper electrodes | Lower electrodes | Pair of electrodes for force measurement |
|---|---|---|---|
| A1 | Rx, Tx | Sx | Rx-Sx or Tx-Sx |
| A2 | Rx, Tx, GND | Sx | GND-Sx |
| A3 | Rx, Sx | Tx | Sx-Tx |
| A4 | Rx | Tx, Sx | Rx-Sx |
| A5 | Rx, Sx | Tx, GND | Sx-GND |
| A6 | Rx, GND | Tx, Sx | GND-Sx |
| A7 | Rx, Tx, Sx | GND | Sx-GND |

Signs representing electrodes
Tx: Transmission electrode for the point detection
Rx: Receiving electrode for the point detection
Sx: Sensing electrode for the force measurement
GND: Ground electrode for the force measurement In Table 1 and the explanation of Table 1, the names of the electrodes are represented by signs. Tx represents the transmission electrode for the point detection, Rx represents the receiving electrode for the point detection, Sx represents the sensing electrode for the force measurement, and GND represents the ground electrode for the force measurement. The signs A1 to A7 are the names of the combinations of electrodes to be arranged which are described herein. For arranging two or three types of electrodes for the upper electrodes and two types of electrodes for the lower electrodes, insulators can be inserted at the intersections of the conductive members constituting those different types of electrodes in order to electrically insulate the conductive members as shown in FIG. 2(a) and FIG. 2(b).

The combination A1 employs Rx and Tx for the upper electrodes and Sx for the lower electrode to be arranged. The pair of electrodes for the force measurement is the combination of Rx and Sx, or Tx and Sx. The electrode (Rx or Tx) combined with Sx is grounded during the force measurement.

The combination A2 employs Rx, Tx and GND for the upper electrodes and Sx for the lower electrode to be arranged. The pair of electrodes for the force measurement is the combination of GND and Sx.

The combination A3 employs Rx and Sx for the upper electrodes and Tx for the lower electrode to be arranged. The pair of electrodes for the force measurement is the combination of Sx and Tx, and Tx is grounded during the force measurement.

The combination A4 employs Rx for the upper electrode and Tx and Sx for the lower electrodes to be arranged. The pair of electrodes for the force measurement is the combination of Rx and Sx, and Rx is grounded during the force measurement.

The combination A5 employs Rx and Sx for the upper electrodes and Tx and GND for the lower electrodes to be arranged. The pair of electrodes for the force measurement is the combination of Sx and GND.

The combination A6 employs Rx and GND for the upper electrodes and Tx and Sx for the lower electrodes to be arranged. The pair of electrodes for the force measurement is the combination of GND and Sx.

The combination A7 employs Rx, Tx and Sx for the upper electrodes and GND for the lower electrode to be arranged. The pair of electrodes for the force measurement is the combination of Sx and GND.

In any one of the combinations A1 to A7, Tx and Rx are the electrodes for the point detection.

FIG. 6 shows an example of the electrode pattern of the combination A5. FIG. 6(a) is the illustrative diagram of the upper electrode 16, FIG. 6(b) is the illustrative diagram of the lower electrode 17, and FIG. 6(c) is a projection view 20 of the electrodes.

The upper electrode 16 is composed of a receiving electrode (Rx) 11 and a sensing electrode (Sx) 13. The receiving electrode (Rx) 11 is composed of the first conductive members 1a, 1b, 1c, and 1d. The first conductive members 1 are linear when viewed from the top and their longitudinal direction is arranged parallel to the y-axis. The sensing electrode (Sx) 13 is composed of the third conductive members 3a, 3b, 3c, and 3d. The third conductive members 3 are linear when viewed from the top and their longitudinal direction is arranged parallel to the y-axis.

The lower electrode 17 is composed of a transmission electrode (Tx) 12 and a ground electrode (GND) 14. The transmission electrode (Rx) 12 is composed of the second conductive members 2a, 2b, 2c, 2d, 2e, and 2f. The second conductive members 2 are linear when viewed from the top and their longitudinal direction is arranged parallel to the x-axis. The ground electrode (GND) 14 is composed of the fourth conductive members 4a, 4b, 4c, 4d, 4e, and 4f. The fourth conductive members 4 are linear when viewed from the top and their longitudinal direction is arranged parallel to the y-axis.

FIG. 6(c) is a projection view 20 of the electrodes. In the projection view, the receiving electrode (Rx) and transmission electrode (Tx) cross each other to form the positional cross regions 21. The sensing electrode (Sx) and ground electrode (GND) also cross each other. The third conductive members 3 are set apart from the positional cross regions 21, and the fourth conductive members 4 are also set apart from the positional cross regions 21.

FIG. 7 shows an example of the electrode pattern of the combination A3. FIG. 7(a) is the illustrative diagram of the upper electrode 16, FIG. 7(b) is the illustrative diagram of the lower electrode 17, and FIG. 7(c) is a projection view 20 of the electrodes.

The upper electrode 16 is composed of a receiving electrode (Rx) 11 and a sensing electrode (Sx) 13. The receiving electrode (Rx) 11 is composed of the first conductive members 1a, 1b, 1c, and 1d. The first conductive members are linear when viewed from the top and their longitudinal direction is arranged parallel to the y-axis.

The sensing electrode (Sx) 13 is composed of the third conductive members 3a, 3b, 3c, and 3d. The third conductive members have wide parts 113 and narrow parts 123 which are arranged alternately when viewed from the top. The third conductive members 3 extend in the direction of the y-axis when viewed from the top. More specifically, the longitudinal direction of the third conductive members 3 is parallel to the y-axis while their transverse direction (width direction) is parallel to the x-axis.

The wide parts 113 of the third conductive members have a width (the length of the transverse direction) greater than the width of the narrow parts 123. The shape of the wide parts 113 is not restricted and can be optionally formed. The wide parts in the present invention are almost shaped rhombic. Examples of other shapes are square, rectangle, hexagon, octagon, circle and ellipse.

The lower electrode 17 is composed of the transmission electrode (Tx) 12, which is composed of the second conductive members 2a, 2b, 2c, 2d, 2e, and 2f. The second conductive members 2 have wide parts 112 and narrow parts 122 which are arranged alternately when viewed from the top. The second conductive members 2 extend in the direction of the x-axis when viewed from the top.

As shown in the projection view 20 of the electrodes of FIG. 7(c), the third conductive members 3 cross the second conductive members 2. The narrow parts 123 of the third conductive members 3 overlap the second conductive members 2. The above-mentioned form of the overlap increases the effective area of the electrodes for the force measurement to improve the sensitivity of the force measurement. The above-mentioned form of the overlap also makes sufficient distance between the positional cross regions and the sensing electrodes (i.e., the third conductive members) to minimize the decrease in the sensitivity of the point detection.

In the electrode pattern shown in FIG. 7, the transmission electrodes (i.e., the second conductive members 2) functioning as the ground electrodes also have the wide parts 112 and narrow parts 122, and the narrow parts 122 cross the first conductive members 1. The crossing further increases the sensitivity of the force measurement and further minimizes the decrease in the sensitivity of the point detection.

The electrode composed of a group of conductive members which cross the third conductive members 3 having the wide parts 113 and narrow parts 123 is not restricted to a transmission electrode (Tx), and may be a receiving electrode (Rx).

FIG. 8 shows another example of the electrode pattern of the combination A5. FIG. 8(a) is the illustrative diagram of the upper electrode 16, FIG. 8(b) is the illustrative diagram of the lower electrode 17, and FIG. 8(c) is a projection view 20 of the electrodes.

The upper electrode 16 is composed of a receiving electrode (Rx) 11 and a sensing electrode (Sx) 13. The receiving electrode (Rx) 11 is composed of the first conductive members 1a, 1b, 1c, and 1d. The first conductive members 1 are linear when viewed from the top and their longitudinal direction is arranged parallel to the y-axis.

The sensing electrode (Sx) is composed of the third conductive members 3a, 3b, 3c, and 3d. The third conductive members 3 have wide parts 113 and narrow parts 123 which are arranged alternately when viewed from the top.

The lower electrode 17 is composed of a transmission electrode (Tx) 12 and a ground electrode (GND) 14. The transmission electrode (Tx) 12 is composed of the second conductive members 2a, 2b, 2c, 2d, 2e, and 2f. The second conductive members 2 are linear when viewed from the top, and their longitudinal direction is arranged parallel to the x-axis.

The ground electrode (GND) 14 is composed of the fourth conductive members 4a, 4b, 4c, 4d, 4e, 4f and 4g. The fourth conductive members 4 have wide parts 114 and narrow parts 124 which are arranged alternately when viewed from the top.

In the projection view 20 of the electrodes of FIG. 8(c), the wide parts 113 of the third conductive members 3 overlap the wide parts 114 of the fourth conductive members 4. The form of the electrodes and the mode of their arrangement increase the effective area of the pair of the electrodes for the force measurement, and enable the use of wide effective area for measuring the electric charge generated in the piezoelectric body responding to pressing force so as to improve the sensitivity of the force measurement.

The space between the positional cross regions and the third conductive members 3 is maintained by setting the third conductive members 3 apart from the positional cross regions and their surrounding area. The space between the positional cross regions and the fourth conductive members 4 is maintained in the similar manner. Thus the accuracy and sensitivity of the point detection are maintained.

Then the piezoelectric region of the piezoelectric body 31 is described. The description of the piezoelectric region mentions the plan view of the plate-like piezoelectric body 31 viewed from the top.

The piezoelectric body 31 of the present invention may have piezoelectricity throughout its area on the plan view, or have localized piezoelectricity in some parts on the plan view.

The localized piezoelectricity of the piezoelectric body should preferably exist only at the parts covered by the sensing electrode (Sx) (i.e., the third conductive members).

In a touch panel having the sensing electrode (Sx) and the ground electrode (GND) used exclusively as a ground electrode (GND), the piezoelectricity of the piezoelectric body should preferably exist only at the parts covered by the overlap of the third conductive members and the fourth conductive members as shown in the projection view of the electrodes.

A touch panel incorporated with the piezoelectric body having localized piezoelectricity as mentioned above is free from interference in the point detection which is caused by electrical charge generated in the piezoelectric body by pushing. Thus the touch panel maintains the accuracy and sensitivity of the point detection.

The piezoelectric body having localized piezoelectricity as mentioned above can be manufactured, for example, by the following process. An upper electrode and lower electrode are attached on a piezoelectric body before polarization, and then the piezoelectric body is polarized by loading voltage on the pair of the electrode for the force measurement.

Then the manner of forming the upper and lower electrodes is described.

FIG. 9 is the sectional view of touch panels. FIG. 9(a), FIG. 9(b), FIG. 9(c), and FIG. 9(d) show touch panels fabricated with different manners of forming electrodes. The spaces between upper and lower members shown in each figure (for example, the space between the surface member 33 and the upper electrode 16 in FIG. 9(a)) indicate the surfaces bonded with an adhesive. The adhesive includes, for example, a pressure-sensitive adhesive.

Figure 9A:
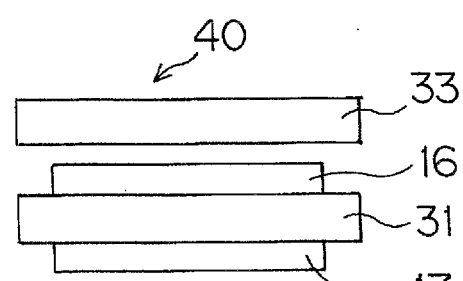
FIGS. 9(a) to 9(d) are sectional views of the touch panels illustrating the manner of forming the electrodes.

The touch panel in FIG. 9(a) has the upper electrode 16 formed on one surface of the piezoelectric body 31 and the lower electrode 17 formed on the other surface of the piezoelectric body 31. The electrodes may be formed by spattering, printing, bonding metal foils, such as copper foil, with adhesive, or plating. The surface member 33 is laid on the upper electrode 16. The material for the surface member 33 include, for example, those composed of glass materials, such as soda glass, alkali-free glass, borosilicate glass and quartz glass; and those composed of various resins, such as polyimide resins, acrylic resins, polyester resins and polycarbonate resins.

Figure 9B:
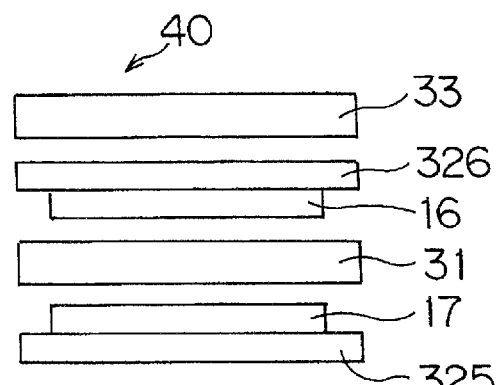

The touch panel shown in FIG. 9(b) is fabricated by forming the upper electrode 16 on one surface of the support film 326 and the lower electrode 17 on one surface of the other support film 325, and by layering, from the bottom, the support film 325 having the lower electrode 17, the piezoelectric body 31, the support film 326 having the upper electrode 16, and the surface member 33 in the order.

Figure 9C:
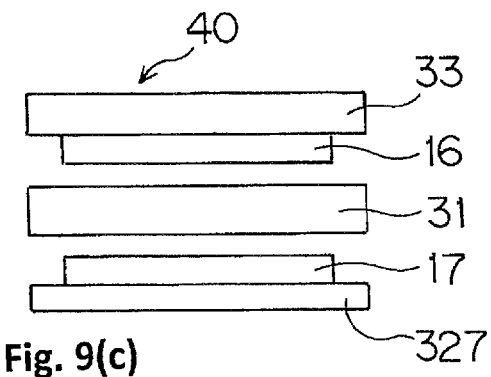

The touch panel shown in FIG. 9(c) has the upper electrode 16 formed on one surface of the surface member 33. On a surface member 33 made of glass, the upper electrode 16 can be formed by so-called on-glass-sensor technology. The lower electrode 17 is formed on one surface of the support film 327. The touch panel is fabricated by layering, from the bottom, the support film 327 having the lower electrode 17, the piezoelectric body 31, and the surface member 33 having the upper electrode 16 in the order.

Figure 9D:
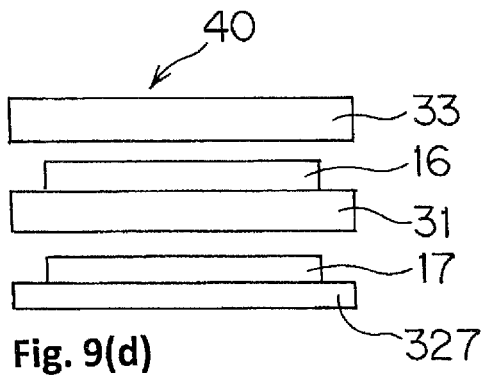

The touch panel shown in FIG. 9(d) is fabricated by forming the upper electrode 16 on one surface of the piezoelectric body 31 and the lower electrode 17 on one surface of the support film 327, and by layering, from the bottom, the support film 327 having the lower electrode 17, the piezoelectric body 31 having the upper electrode 16, and the surface member 33 in the order.

The layers of the touch panels described by referring to FIG. 9(a) to FIG. 9(d) may be fixed with an adhesive.

Then the point detection and force measurement by the touch panel are described.

Figure 10:
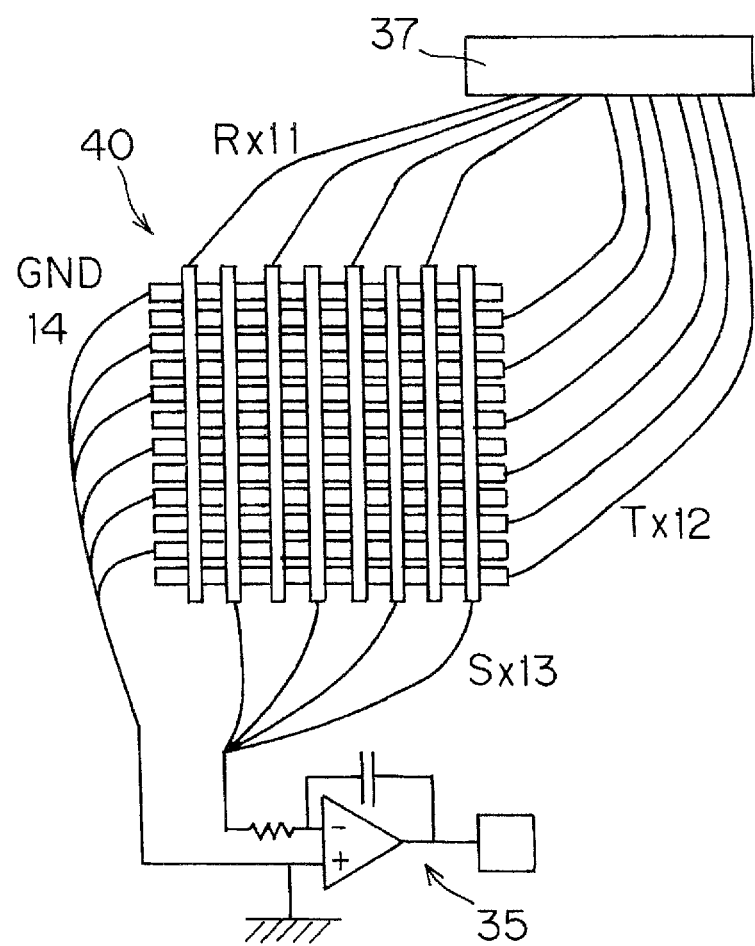
FIG. 10 is an illustrative diagram of a circuit showing an example of the circuit for the point detection and force measurement.

FIG. 10 is the illustrative diagram of the circuit of a touch panel having the sensing electrode (Sx) 13 and ground electrode (GND) 14 for the force measurement and the receiving electrode (Rx) 11 and transmission electrode (Tx) 12 for the point detection.

The transmission electrode (Tx) 12 and receiving electrode (Rx) 11 are connected to the matrix detecting circuit 37. The matrix detecting circuit 37 is a publicly known detecting circuit using projected capacitive system for the detection of a contact point on the touch panel. The contact point and the point of pressing are the same. The sensing electrode (Sx) 13 is connected to the charge amplifier 35, and the ground electrode (GND) 14 is grounded.

The electrical charge generated in the piezoelectric body by pressing is detected by the sensing electrode (Sx) 13 and measured into voltage value by the charge amplifier 35. The measured voltage value indicates the pressing force.

Figure 11:
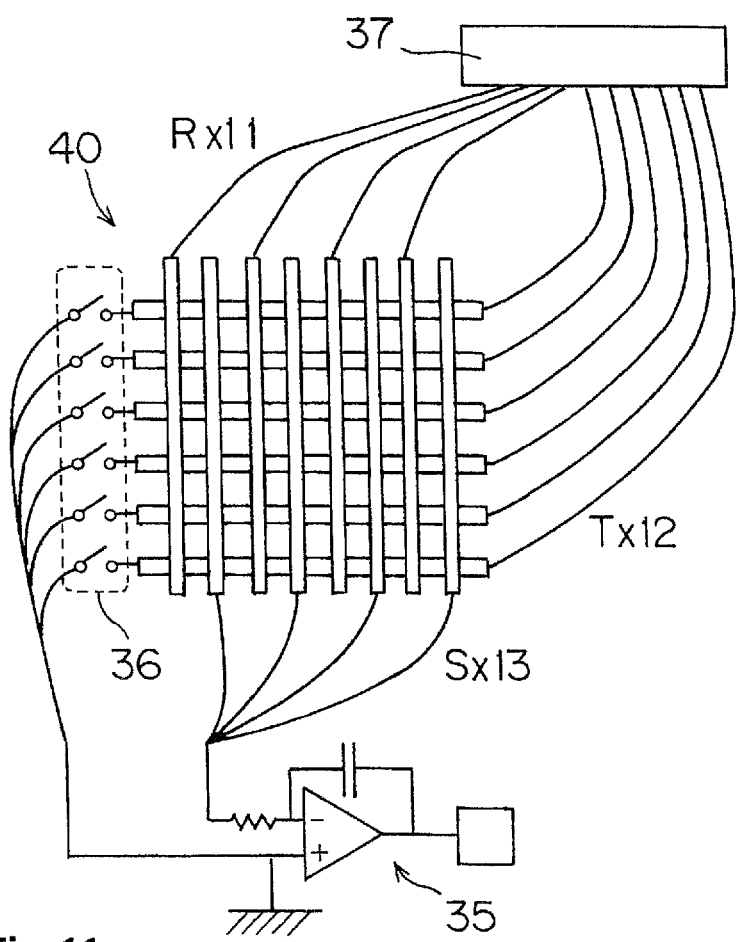
FIG. 11 is an illustrative diagram of a circuit showing another example of the circuit for the point detection and force measurement.

FIG. 11 is the illustrative diagram of a circuit of the touch panel having the sensing electrode (Sx) 13 for the force measurement, and the receiving electrode (Rx) 11 and transmission electrode (Tx) 12 for the point detection.

The transmission electrode (Tx) 12 and receiving electrode (Rx) 11 are connected to the matrix detecting circuit 37. For the point detection, the switches 36 are turn off and the transmission electrode (Tx) 12 is ungrounded.

The contact point is detected by the matrix detecting circuit 37 in the same manner as that by the touch panel illustrated in FIG. 10.

The sensing electrode (Sx) is connected to the charge amplifier 35. For the force measurement, the switches 36 are turn on and the transmission electrode (Tx) 12 is grounded. Under the condition, the transmission electrode 12 functions as the ground electrode. The voltage value is measured by the charge amplifier 35 in the same manner as that by the panel illustrated in FIG. 10.

Subsequently described are the touch panel having a piezoelectric plate imparted with the property of wave plate and the electronic device composed of the touch panel and a display device.

Figure 12:
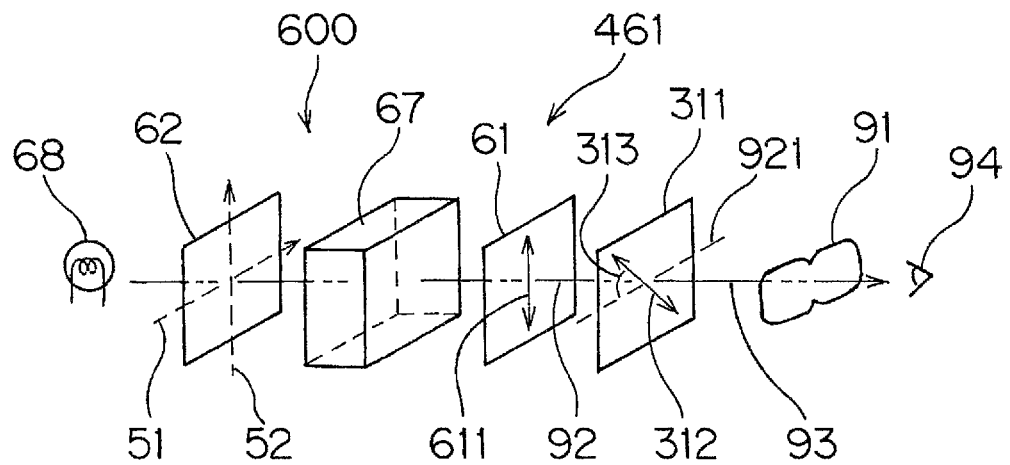
FIG. 12 is an illustrative diagram of an electronic device 461 composed of an LCD 600 and a touch panel.

FIG. 12 is the illustrative diagram of the electronic device 461 composed of the LCD 600 and a touch panel. The LCD 600 is a display device, and the touch panel includes the piezoelectric body 311. The electrodes for the force measurement and point detection are omitted in the figure.

The LCD 600 is composed of the light source 68, the lower polarization plate 62, liquid crystal cell 67 and the upper polarization plate 61, and emits visible light 92. The direction of the x-axis is indicated by the dashed arrow 51 and the direction of the y-axis is indicated by the dashed arrow 52. The direction of the z-axis indicates the direction of the emitted light 92.

The absorption axis 611 of the upper polarization plate 61 is parallel to the y-axis. The emitted light 92 is linearly-polarized light. If the piezoelectric body 311 does not have the property of wave plate, the display will be blacked out when the emitted light 92 is seen with eyes 94 through polarizing sunglasses 91 which are rotated to a certain position on the x-y plane. In other words, the view turns dark to make the display unseen at a specific position of the rotation of the polarizing sunglasses 91.

The electronic device 461 of the present invention employs the piezoelectric body 311 having the property of wave plate to avoid the blackout. The plane of vibration of the emitted light 92 is parallel to the x-z plane. The plane of vibration is projected into a line on the surface of the piezoelectric body 311 and is represented by the vibration line 921. The angle between the plane of vibration of the emitted light 92 and the slow axis 312 of the piezoelectric body 311 (or called optical axis of the wave plate) is equal to the angle between the vibration line 921 and the slow axis 312, and shown as the angle 313.

The angle between the slow axis 312 of the piezoelectric body 311 (or called optical axis of the wave plate) and the plane of vibration of the emitted light 92 (which is equal to the angle 313) is usually made within the range from 20 degrees to 70 degrees, preferably from 35 degrees to 55 degrees. Such angle properly transforms the polarization of the linearly-polarized light.

The angle 313 is the smaller of the two angles made at the intersection of the plane and the axis.

The emitted light 92 is changed into transformed light 93, which is circularly-polarized light or elliptically-polarized light, when the light passes through the piezoelectric body 311. The transformed light 93 does not black out when observed with eyes 94 through polarized sunglasses 91.

The performance of wave plate can be imparted to a piezoelectric body by making piezoelectric film and extending the film uniaxially. The piezoelectric film may be uniaxially extended before or after it is polarized. Usually piezoelectric film is uniaxially extended before polarization, and subsequently the film is polarized by applying voltage.

The retardation value of the piezoelectric body 311 should range (1) from 110 nm to 170 nm or (2) from 800 nm to 30,000 nm. A piezoelectric body having a retardation value ranging (1) from 110 nm to 170 nm transforms linearly-polarized light of a certain wavelength into circularly-polarized light and transforms the linearly-polarized light of other wavelengths into elliptically-polarized light within the wavelength region of visible light. A piezoelectric body having a retardation value ranging (2) from 800 nm to 30,000 nm transforms linearly-polarized light of a plurality of certain wavelengths into circularly-polarized light and transforms the linearly-polarized light of other wavelengths into elliptically-polarized light within the wavelength region of visible light.

The retardation value of the piezoelectric body 311 may be a value calculated by multiplying the wavelength of the emitted light, $\lambda$ (lambda), by $(1/4+K/2)$, where K is zero or a positive integer.

Figure 13:
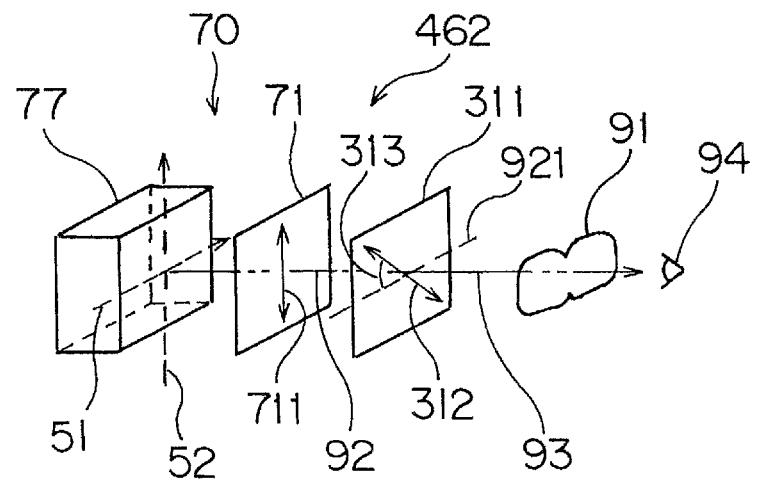
FIG. 13 is an illustrative diagram of an electronic device 462 composed of an OLED 70 and a touch panel.

FIG. 13 is an illustrative diagram of the electronic device 462. The electronic device 462 is composed of the OLED 70 and a touch panel. The OLED 70 is a display device and the touch panel includes the piezoelectric body 311. The electrodes for the force measurement and point detection are omitted in the figure.

The OLED 70 is composed of the light-emitting cell 77 and the polarization plate 71, and emits the visible emitted light 92.

In the figure, the direction of the x-axis is indicated by the dashed arrow 51 and the direction of the y-axis is indicated by the dashed arrow 52. The direction of the z-axis is the same as the advancing direction of the emitted light 92.

The absorption axis 711 of the polarization plate 71 is parallel to the y-axis. The emitted light 92 is linearly-polarized light and has a plane of vibration parallel to the y-axis. The piezoelectric body 311 has the property of wave plate.

The angle 313 made at the intersection of the slow axis 312 of the piezoelectric body 311 and the plane of vibration of the emitted light 92 is the same as that of the electronic device 461.

The method for imparting the property of wave plate to the piezoelectric body, the range of the retardation value of the piezoelectric body, and their effects are the same as that described for the electronic device 461.

The upper electrode 16 and the lower electrode 17 mentioned above are made of publicly known transparent conductive materials, for example, ITO film and TZO film. The electrodes may be formed by printing with inks containing conductive polymers such as PEDOT or metal nanofibers. Further, metal foils, metal pastes or carbon paste may be employed for the printing if the resultant touch panels are not required to be transparent.

The embodiments of the touch panel of the present invention are described above with reference to the figures.

Specific examples of the embodiments are not restricted within the scope of those embodiments, and a design change within the scope of the subject matter of the present invention is included in the present invention.

REFERENCE SIGNS LIST

1 First conductive members
2 Second conductive members
3 Third conductive members
4 Fourth conductive members
11 Receiving electrode (Rx) used as one type of electrode or the other type of electrode for the point detection
12 Transmission electrode (Tx) used as one type of electrode or the other type of electrode for the point detection
13 Sensing electrode (Sx) used as one of the pair of electrodes for the force measurement
14 Ground electrode (GND) used as one of the pair of electrodes for the force measurement
16 Upper electrode
17 Lower electrode
20 A projection view of electrodes
21 Positional cross region
31 Piezoelectric body
33 Surface member
34 Insulator
35 Charge amplifier
36 Switch
37 Matrix detecting circuit
40 Touch panel
41 Touch panel including a frame
42 Touch panel including a display device
43 Touch panel including a display device and having electrodes for the touch panel incorporated therein
44 Frame
45 Display-constituting electrode
46 Electronic device
51 Arrow indicating the x-axis
52 Arrow indicating the y-axis
53 Arrow indicating upper direction
59 Display device with built-in electrodes for a touch panel
60 Display device
61 Upper polarization plate
62 Lower polarization plate
63 Upper glass plate
64 Liquid crystal
65 Lower glass plate
67 Liquid crystal cell
70 OLED
71 Polarization plate
77 Light-emitting cell
81, 82, 83, 84, 85, 86, 87 Arrows indicating the positions to which the lower electrode can be inserted
91 Polarized sunglasses
92 Emitted light
93 Transformed light
94 Eye for observation
101, 102, 103 Support bases
112, 113, 114 Wide parts
122, 123, 124 Narrow parts
311 Piezoelectric body functioning as a wave plate
312 Slow axis
313 Angle
461 Electronic device
462 Electronic device
600 LCD
611 Absorption axis
711 Absorption axis

The invention claimed is:

1. A touch panel provided with performances of force measurement using a piezoelectric body and point detection using a projected capacitive system, the touch panel comprising:

a pair of electrodes arranged with a plate-like piezoelectric body sandwiched between the pair of electrodes, each of the pair of electrodes comprising a conductive member, the piezoelectric body having a plate-like surface parallel to a x-y plane, the piezoelectric body and the pair of electrodes being layered vertically, and the pair of electrodes including a sensing electrode and a ground electrode, and being employed for the force measurement; and two types of electrodes including one type comprising a group of conductive members arranged parallel to a certain direction on the x-y plane and the other type comprising another group of conductive members arranged parallel to each other and extending in a direction across the certain direction on the x-y plane, the two types of electrodes being employed for the point detection;

wherein at least one upper electrode is disposed on a side of a top surface of the piezoelectric body, the conductive member constituting the upper electrode has at least a part forming a plane parallel to the x-y plane, at least one lower electrode is disposed on a side of a bottom surface of the piezoelectric body, the conductive member constituting the lower electrode has at least a part forming a plane parallel to the x-y plane, one of the pair of electrodes used for the force measurement is the lower electrode, and at least one of the two types of electrodes used for the point detection is the upper electrode, a sum of numbers of the electrodes in the upper and lower electrodes is three, the ground electrode is used as the one type of the electrode or the other type of the electrode for the point detection, the touch panel is used on a display surface of a display device, a visible light emitted from the display surface of the display device is a linearly-polarized light, and the piezoelectric body is a wave plate used in an arrangement to make an angle ranging from 20 degrees to 70 degrees between a slow axis of the wave plate of the piezoelectric body and a plane of vibration of the linearly-polarized light.

2. A touch panel according to claim 1, wherein the touch panel is used on the display surface of the display device; the visible light emitted from the display surface of the display device is the linearly-polarized light, and the piezoelectric body is the wave plate having a retardation value ranging from 110 nm to 170 nm.

3. A touch panel according to claim 1, wherein the touch panel is used on the display surface of the display device, the visible light emitted from the display surface of the display device is the linearly-polarized light, and the piezoelectric body is the wave plate having a retardation value ranging from 800 nm to 30,000 nm.

4. A touch panel provided with performances of force measurement using a piezoelectric body and point detection using a projected capacitive system, the touch panel comprising:

a pair of electrodes arranged with a plate-like piezoelectric body sandwiched between the pair of electrodes, each of the pair of electrodes comprising a conductive member, the piezoelectric body having a plate-like surface parallel to a x-y plane, the piezoelectric body and the pair of electrodes being layered vertically, and the pair of electrodes including a sensing electrode and a ground electrode, and being employed for the force measurement; and two types of electrodes including one type comprising a group of conductive members arranged parallel to a certain direction on the x-y plane and the other type comprising another group of conductive members arranged parallel to each other and extending in a direction across the certain direction on the x-y plane, the two types of electrodes being employed for the point detection;

wherein at least one upper electrode is disposed on a side of a top surface of the piezoelectric body, the conductive member constituting the upper electrode has at least a part forming a plane parallel to the x-y plane, at least one lower electrode is disposed on a side of a bottom surface of the piezoelectric body, the conductive member constituting the lower electrode has at least a part forming a plane parallel to the x-y plane, one of the pair of electrodes used for the force measurement is the lower electrode, and at least one of the two types of electrodes used for the point detection is the upper electrode, a sum of numbers of the electrodes in the upper and lower electrodes is three, the ground electrode is used as the one type of the electrode or the other type of the electrode for the point detection, the two types of electrodes are employed for the point detection and includes the one type comprising first conductive members comprising the group of conductive members and the other type comprising second conductive members comprising the another group of conductive members, the sensing electrode comprises third conductive members comprising the other group of conductive members, the third conductive members are arranged parallel to the first conductive members and set apart from positional cross regions which are cross regions of the first and second conductive members in a projection view of electrodes in which the upper and lower electrodes are projected on a virtual x-y plane, the third conductive members have wide and narrow parts arranged alternately, and the narrow parts cross the second conductive members in the projection view of the electrodes, and the first conductive members constituting the one type of the electrode have wide and narrow parts arranged alternately, and the wide parts of the first conductive members overlap the wide parts of the third conductive members in the projection view of the electrodes.

5. A touch panel according to claim 4, wherein the upper electrode includes a receiving electrode as the one type of the electrode for the point detection and a transmission electrode as the other type of electrode for the point detection, and the lower electrode includes the sensing electrode for the force measurement.

6. A touch panel according to claim 4, wherein the upper electrode includes a receiving electrode as the one type of the electrode for the point detection and the sensing electrode for the force measurement, and the lower electrode includes a transmission electrode as the other type of electrode for the point detection.

7. A touch panel according to claim 4, wherein the upper electrode includes a receiving electrode as the one type of the electrode for the point detection, and the lower electrode includes a transmission electrode as the other type of electrode for the point detection and the sensing electrode for the force measurement.

* * * * *